(12) United States Patent
Drako et al.

(10) Patent No.: US 11,019,310 B1
(45) Date of Patent: May 25, 2021

(54) TRANSFORMING A QR CODE AND DNS SERVER TO ENABLE EMERGENCY ACCESS TO A PRIVATE VIDEO SURVEILLANCE STREAM

(71) Applicant: EAGLE EYE NETWORKS, INC., West Lake Hills, TX (US)

(72) Inventors: Dean Drako, Austin, TX (US); Tim Duncan, Austin, TX (US)

(73) Assignee: EAGLE EYE NETWORKS, INC., Austin, TX (US)

( * ) Notice: Subject to any disclaimer, the term of this patent is extended or adjusted under 35 U.S.C. 154(b) by 0 days.

(21) Appl. No.: 16/890,193

(22) Filed: Jun. 2, 2020

(51) Int. Cl.
| | |
|---|---|
| *G06F 15/16* | (2006.01) |
| *H04N 7/18* | (2006.01) |
| *G06K 19/06* | (2006.01) |
| *H04L 29/12* | (2006.01) |
| *H04L 12/24* | (2006.01) |
| *G06T 19/00* | (2011.01) |
| *H04L 29/06* | (2006.01) |
| *H04L 29/08* | (2006.01) |

(52) U.S. Cl.
CPC ....... *H04N 7/181* (2013.01); *G06K 19/06037* (2013.01); *G06T 19/006* (2013.01); *H04L 41/22* (2013.01); *H04L 61/1511* (2013.01); *H04L 63/08* (2013.01); *H04L 67/16* (2013.01); *H04L 61/6022* (2013.01); *H04L 61/6059* (2013.01)

(58) Field of Classification Search
CPC . H04L 41/22; H04L 61/1511; H04L 61/6022; H04L 61/6059; H04L 63/08

USPC ........................................................ 709/219
See application file for complete search history.

(56) References Cited

U.S. PATENT DOCUMENTS

| | | | |
|---|---|---|---|
| 7,680,121 B2* | 3/2010 | Ogawa | H04L 29/12113 370/395.2 |
| 9,979,740 B2* | 5/2018 | Christian | G06N 20/00 |
| 10,178,118 B2* | 1/2019 | Christian | G06N 20/00 |
| 2005/0036491 A1* | 2/2005 | Ogawa | H04L 67/104 370/395.2 |
| 2006/0077984 A1* | 4/2006 | Sakai | H04L 29/12066 370/395.52 |
| 2007/0081544 A1* | 4/2007 | Sakai | H04L 29/12047 370/401 |
| 2017/0171234 A1* | 6/2017 | Christian | H04L 63/1425 |

* cited by examiner

*Primary Examiner* — Moustafa M Meky
(74) *Attorney, Agent, or Firm* — Patentry; Peter G. H. Hwang

(57) ABSTRACT

Private video streams are provided to emergency services agents' devices by authenticating UDP packets at an access control server and initiating an Application Programming Interface at a video server. The access control server conditionally responds to a UDP query from a mobile device with an answer containing an address of an API. Settings provided by a facility/video stream owner validate the query, and synthesize a one-time IPv6 address. A virtual machine image of an API couples cameras to mobile devices. Video images are transformed into a pastiche with 2D facility maps or 3D models. The device transforms an optical image e.g. a QRcode into a packet for transmission as a query. The packet contains authentication credentials and identity indicia of sender and desired video image access. The device receives a reply containing the address of the API and displays resulting video.

12 Claims, 6 Drawing Sheets

TRANSFORMING A QR CODE AND DNS SERVER TO ENABLE EMERGENCY ACCESS TO A PRIVATE VIDEO SURVEILLANCE STREAM

CROSS-REFERENCE TO RELATED APPLICATIONS

Not Applicable

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to video streams from private security surveillance cameras. The present invention relates to access control to said video streams by emergency services agencies. The present invention relates to requests transmitted by mobile devices and responsive provision of application programming interfaces at a video server.

Description of the Related Art

Medium Access Control (MAC) is defined in IEEE 802 LAN/MAN standards. Applicant uses MAC in its well-known conventional meaning. User Datagram Protocol (UDP) is defined in RFC 768. Applicant uses UDP in its well-known conventional meaning. Domain Name System (DNS) is defined and used in many RFC documents of the Internet Engineering Task Force including RFC1591. Applicant uses DNS in its well-known and conventional meaning. However, within this application, Applicant defines and uses fictitious Domain Name System name (ficDNS name) and faux Domain Name System server (fxDNS server) for idiosyncratic and proprietary meanings. QR code is a trademark for a type of matrix barcode. Applicant uses QR code in its colloquial unlicensed generic exemplary meaning as any machine readable optically encoded string providing a reference locator. Applicant does not assert any ownership or inventorship of the QR Code intellectual property.

As is known, simply connecting webcams to the Internet enables uncontrolled access by anyone who can guess an IP address or methodically search for a specific one. As is known, services that provide cloud-based video surveillance require authorized accounts, user identification, and passwords to enable access. It is thought that forcing every property owner to enable police and fire departments to access their private assets at any time and for any purpose would be unacceptable generally.

As is known, conventional fire system diagrams are made accessible to fire fighters enroute to or on site of a facility. As is known, private video surveillance cameras are supported by cloud-based, surveillance-as-a-service data centers with security systems. What is needed is a method for providing fire fighters and other public safety services agents with emergency access to video streams without requiring new accounts, ids, and software distribution. What is needed is a method to enable facility/video stream owners to retain complete control over access to their assets. What is needed is a system to enable flexible controlled access to video streams from private cameras without creating additional user accounts, ids, and passwords.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Private security surveillance video streams are provided to devices operated by emergency services agents by authenticating UDP packets with settings at an access control server, and initiating an Application Programming Interface at a video server. A private video stream is distributed by a secure server to emergency service agent's device upon scanning an optically encoded referral which activates an Application Programming Interface.

An access control server conditionally responds to a UDP query from a mobile device with an answer containing an IPv6 address of a video server. A Domain Name System formatted query initiates validation and authentication by settings provided by the video stream owner (or his designated operator).

Settings provided by a facility/video stream owner are compared with a UDP packet to validate a query. The access control server initiates an Application Programming Interface and synthesizes an IPv6 address for the reply UDP packet. User settings stored at a DNS-style server enable an API when the requestor passes an authentication/validation screen and return a transitory IPv6 resource locator of the virtual machine hosting said API.

A video server, when enabled, provides private video images to authenticated devices operated by emergency services agents. A virtual machine image of an API couples cameras to mobile devices. Static and dynamic video images are transformed into a pastiche with 2D facility maps or 3D models for augmented reality display.

Enabled by time and viewer access permissions, the video server transmits a logical or physical map of cameras with operable icons, which invoke obfuscated IPv6 links to a video stream overlaid on a perspective view of a 3D model of a facility or to an augmented reality view of the 3D model with camera view ports (or mirror image) superposed when looking along the borehole of each camera.

A mobile device transforms an optical image into a UDP packet for transmission to an access control server as a query. The UDP packet contains authentication credentials and identity indicia of sender and desired video image access. The device receives a reply containing a IPv6 address of a video server and operates an API to display private video images from security surveillance cameras when approved by the facility/video stream owner.

A device scans an optical code and receives a wireless stream of video from cameras in the facility. The video may be superposed on a map or 3D model of the facility. When the device is within the facility, a transformed video image is presented whenever the device is aligned with a camera.

In summary, a time and permission controlled code (by analogy, QR-like) with fictitious domain name stored in computer readable media is scanned by a cellular phone. The phone attempts a DNS query containing the fictitious domain name. However, it is directed to a faux DNS server. The faux DNS server launches a video server after performing an access control process. The video server provides a facility map/org chart overlaid with selectable obfuscated camera handles. QR-like codes are revoked/enabled by facility/video stream owner by settings.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

Figure 1:
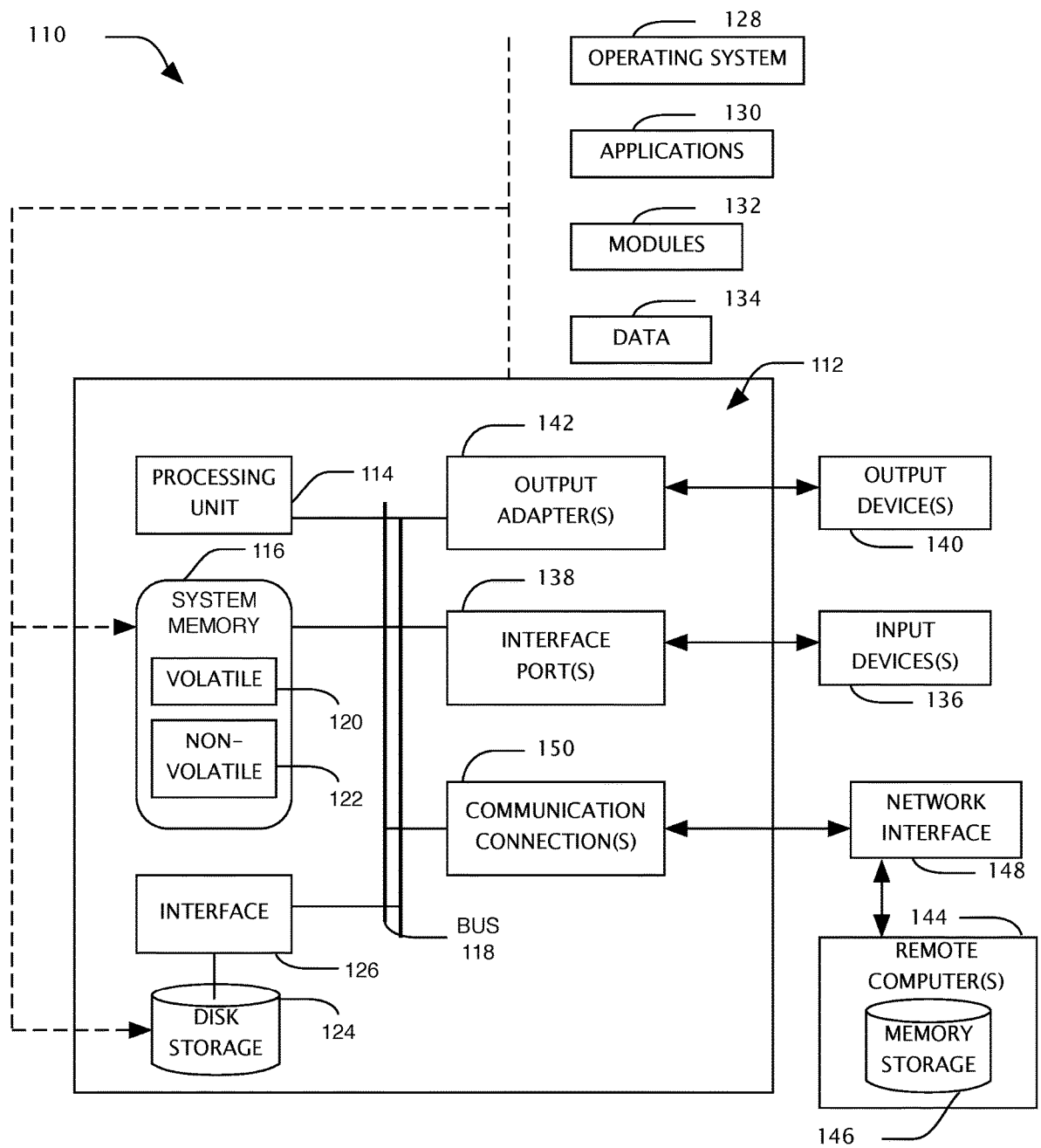
FIG. 1 illustrates an exemplary environment for implementing various aspects of the invention, e.g. a processor suitable for performing processes and method steps disclosed below.

A mobile device receives a (transitory IPv6) resource locator to (a virtual machine hosting) an API to video images and streams from security surveillance cameras. The resource locator is provided upon submitting a query in DNS format which include validation and authentication strings within a fictitious domain name. User privacy settings control the provision of the resource by the answer to said faux DNS server. In an embodiment, a custom app concatenates an agency validation code to a fictitious domain name encoded within an optical pattern provided by a facility/video stream owner. Validation codes expire regularly or with version control of the custom app.

A conventional camera and browser combination enables a query on the fictitious domain name but the facility/video stream owner may have time-limited or default access controls on the API of the video server. The device includes a camera, a processor to transform a video image into a uniform resource location format string concatenated to an agency validation string, a radio transceiver to initiate a query, a display to present video streams received according to the answer, and optionally, a version-controlled app encoded in non-transitory media. A video server is coupled to a plurality of security surveillance cameras and comprises a processor core enabled by an API to present video streams according to obfuscated handles to an authenticated device.

In an embodiment the video streams are presented overlaid on a map or 3D model of the facility based on the location and orientation of the device. In an embodiment, the API is hosted by a virtual machine which is enabled and disabled according to access control by the facility/video stream owner. E.g. "on for TTL" (Time To Live) unless overridden at facility operator console, "off" unless overridden at facility operator console, Dead-man-switch default if no response at facility operator console. Console may enable or disable custom apps and force version updates. In one embodiment of the invention, there are methods performed by a mobile device operated by an emergency services agent, such as a firefighter, and methods performed by access control and video servers coupled to cameras. The access control server is configured to operate as a faux Domain Name System server by receiving queries and responding with answers.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Within this application, we use UDP, MAC, and DNS in its conventional meanings. We use QR loosely to refer to an example of a generic concept of an optically encoded string. Within this application we define and use faux DNS server and fictitious Domain Name exclusively for our explicit meaning.

Figure 2:
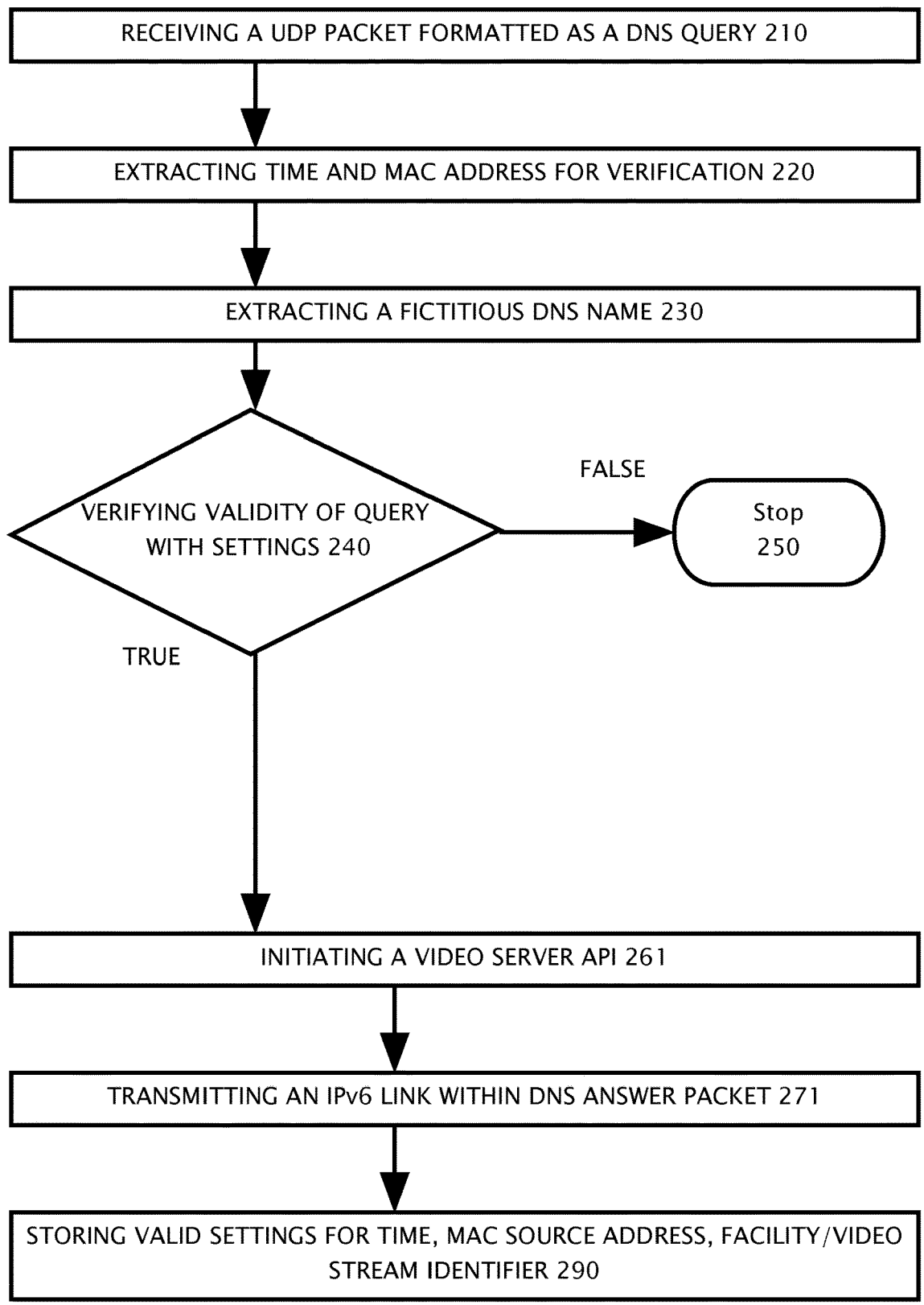
FIG. 2 is a flow chart of a method of operation at a faux DNS server which receives unconventional queries and responds with unconventional answers using UDP packets.

Referring to FIG. 2, one aspect of the invention includes a method 200, at a (faux DNS) fxDNS server, receiving a UDP packet 210 formatted as a Domain Name System (DNS) query, extracting the time and MAC source address for verification 220; extracting a (fictitious Domain Name) ficDNS name 230; verifying validity of query with facility/video stream owner settings (setting) 240; and when verification equals TRUE, initiating a video server API 261; and transmitting an IPv6 link 271 to said video server within a DNS answer packet to the source MAC address. When verification is FALSE, access is denied and the process goes to STOP 250 which may include dropping the Query or responding with an error code according to custom.

The system includes data and instructions to cause distributed processors within these apparatuses to perform the claimed method steps. This diagram provides one illustrative enablement for clarity of exposition but is not to be construed as limiting the invention.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 3:
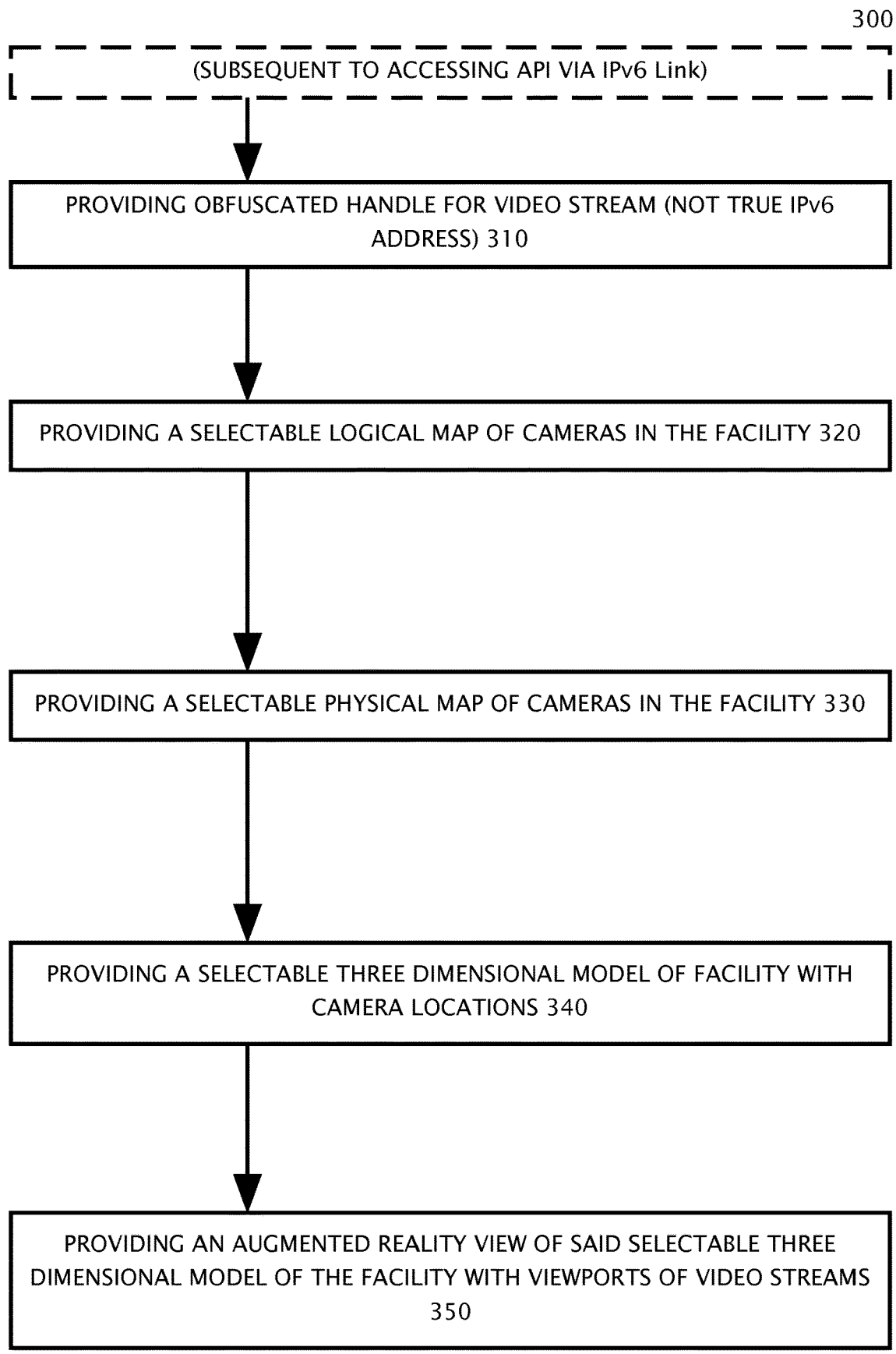
FIG. 3 is a flow chart illustrating an exemplary methodology of additional processes of one or more servers which distinguish the invention.

In embodiments of the method, illustrated in FIG. 3, further features, optionally, the invention includes providing at least one obfuscated handle 310 (rather than an actual IPv6 address of a camera) for a video stream by the video server linked through IPv6. Optionally, the invention includes, providing a selectable logical map 320 of cameras in the facility. (such as in a table of organization, or hierarchy). Optionally, the invention includes providing a selectable physical map 330 of cameras in the facility. Optionally, the invention includes providing a selectable three-dimensional model 340 of facility with camera locations. Optionally, the invention includes providing an augmented reality view of said selectable three-dimensional physical model 350 of camera locations and orientation with viewports along camera boresights.

The invention is distinguished by supporting helmets or facemasks or goggles through which data and video streams may be displayed in context of where the agent is physically located. Video streams may enable looking through doors and walls or around corners using virtual mirrors. The invention is distinguished by combining video streams with the state of sensors, sprinklers, and non-visible measures (e.g. degrees heat, % CO) in a viewport.

Figure 4:
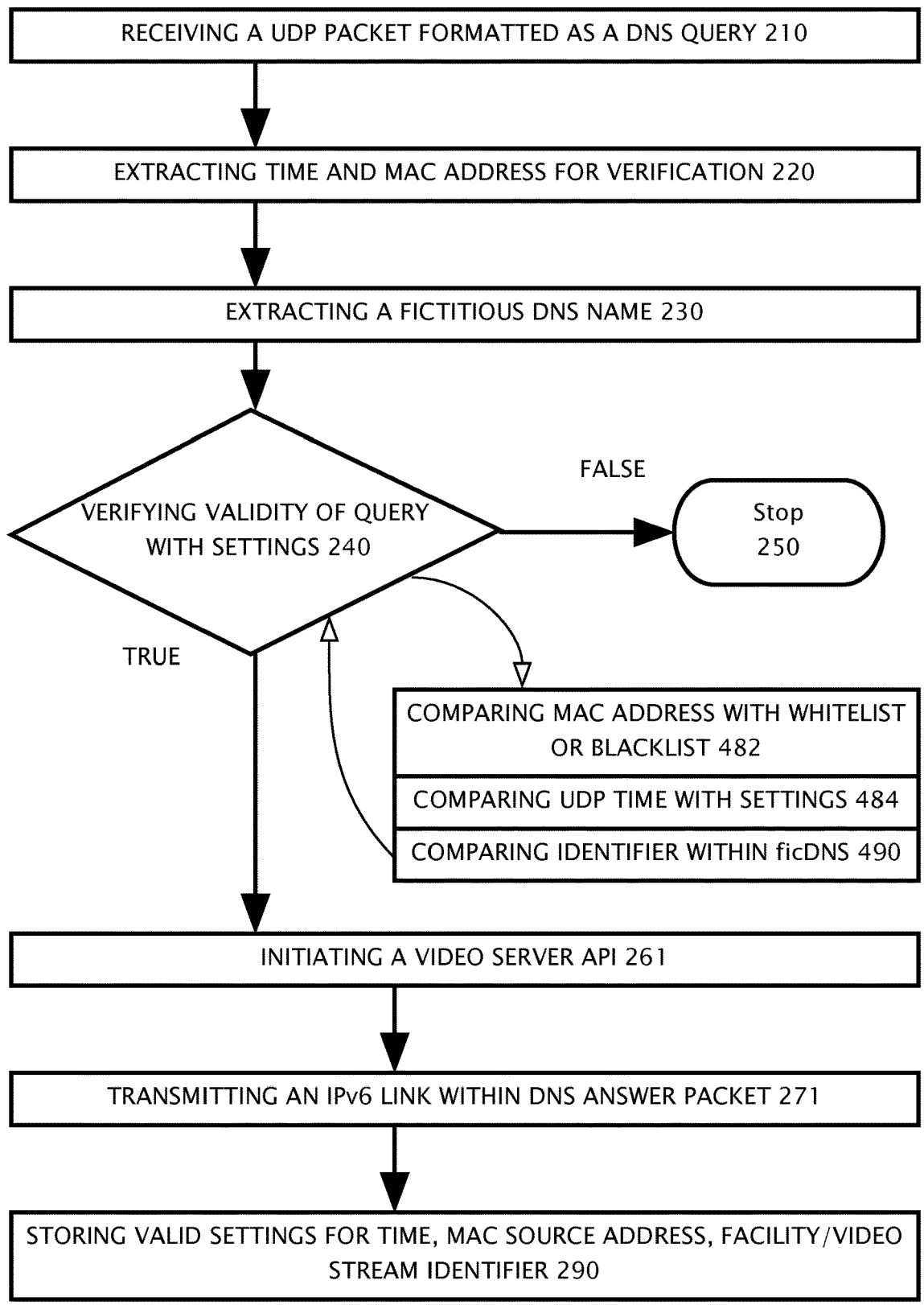
FIG. 4 is a flow chart illustrating an exemplary methodology that provides distinguishing verification/authentication of a query received at the faux DNS server.

Referring now to FIG. 4 there are several options illustrated for verification/authentication of the query including one or more of the following: determining verification by comparing said MAC source address with one of a white list and a black list 482; determining verification by comparing UDP time with settings for TRUE 484; and determining verification by comparing a facility/video stream identifier within the ficDNS name 486 with valid setting for TRUE.

The invention is distinguished by settings stored with the access control server which may be changed at the fxDNS server at any time for each agency or version of an app to enable or disable an API or select among several versions of API.

The invention is distinguished by enabling a "deadman" operation which, in the absence of owner intervention after a trigger, interrupts or enables a default level of access control. E.g. instant ON followed after a period by continuation or denial. The invention is distinguished by enabling either static or dynamic video images according to the MAC address or the agency identifier when provided.

Another aspect of the invention is a method of operation 500 of a device operated by an emergency services agent, like a conventional mobile phone.

Figure 5:
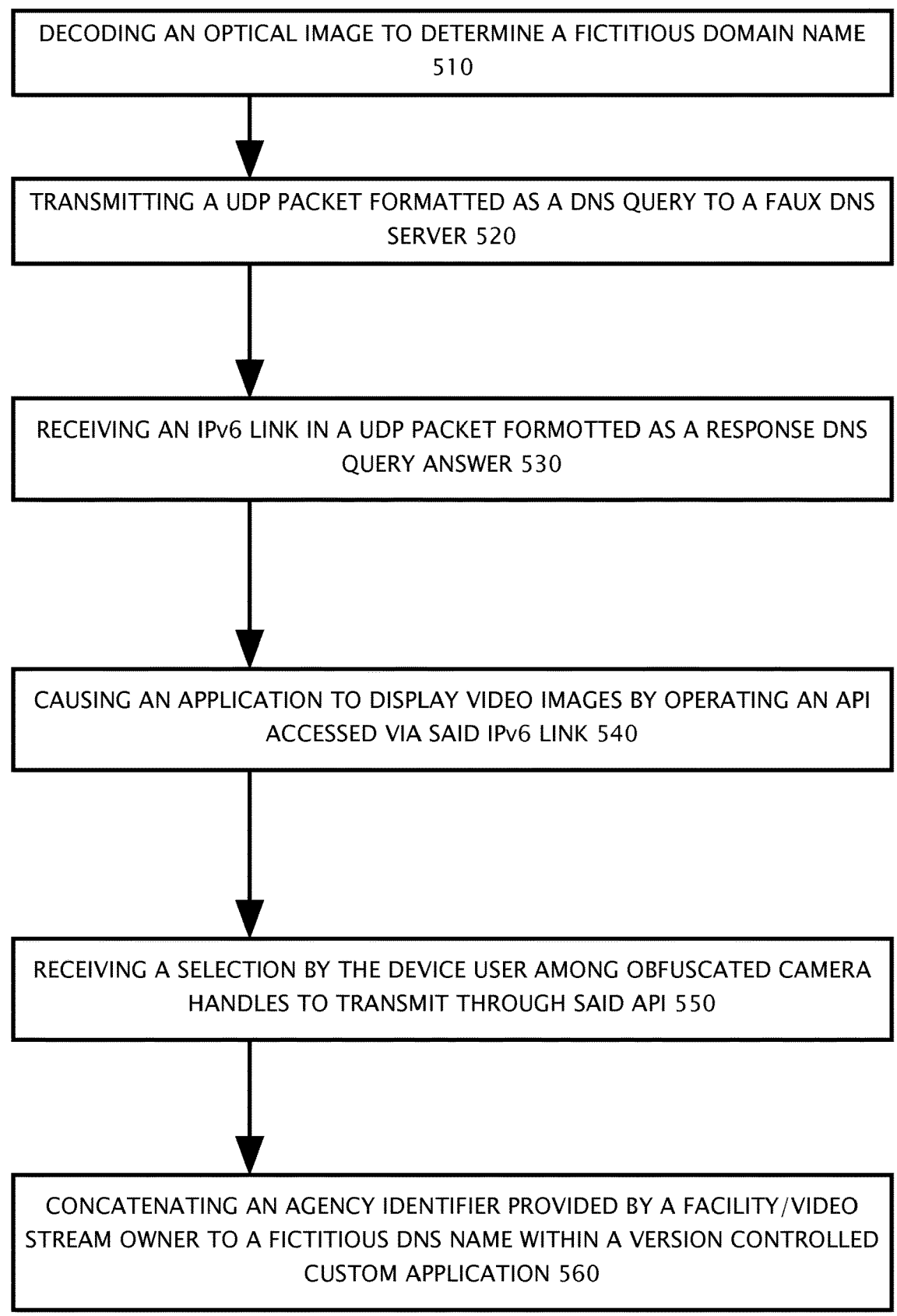
FIG. 5 is a flow chart illustrating an exemplary methodology at a mobile device that requests and displays video images in accordance with an aspect of the subject invention.

Referring to FIG. 5, an illustrative, non-limiting embodiment of the invention is a method 500 which includes, decoding an optical image 510 such as a QR code to determine a fictitious Domain Name (ficDNS name); transmitting a UDP packet 520 formatted as a DNS query to a faux DNS (fxDNS) server, the packet having fields for time, MAC source address, and said ficDNS name; subsequently, receiving an IPv6 link 530 in a UDP packet formatted as a response DNS query answer; causing an application such as a browser to display video images 540 by operating an API accessed via said IPv6 link; and receiving a selection by the device user 550 among obfuscated camera handles to transmit through said API.

A distinguishing characteristic of the invention is that an emergency services agent does not have to enter a user or account id and password to request access to cameras in his scope of interest. A distinguishing characteristic of the invention is that requests for video streams of cameras is transmitted through an API of the video server and not by exposing hard coded camera identifiers or file hierarchies or network architecture. A distinguishing characteristic of the invention is that network firewalls are generally permeable to UDP packets and complex handshaking for verification is unnecessary. A distinguishing characteristic of the invention is that a IPv6 link which is misappropriated has a limited shelf life and may never be repeated during the life of the universe.

The device may be customized in a number of ways to improve security and efficiency, such as by installing a custom, versioned app. Such an app additionally performs concatenating an agency identifier 560 provided by a facility/video stream owner to said ficDNS name. Individual agencies may be selectively added, removed, or have access controlled by the release of time-limited versions of the app. The invention is distinguished by enabling different levels of access to individual emergency services agencies. Versions of apps may expire at different times or upon demand. Embedded agency identifiers in ficDNS names determine which API or which cameras are enabled and for their span of availability.

Figure 6:
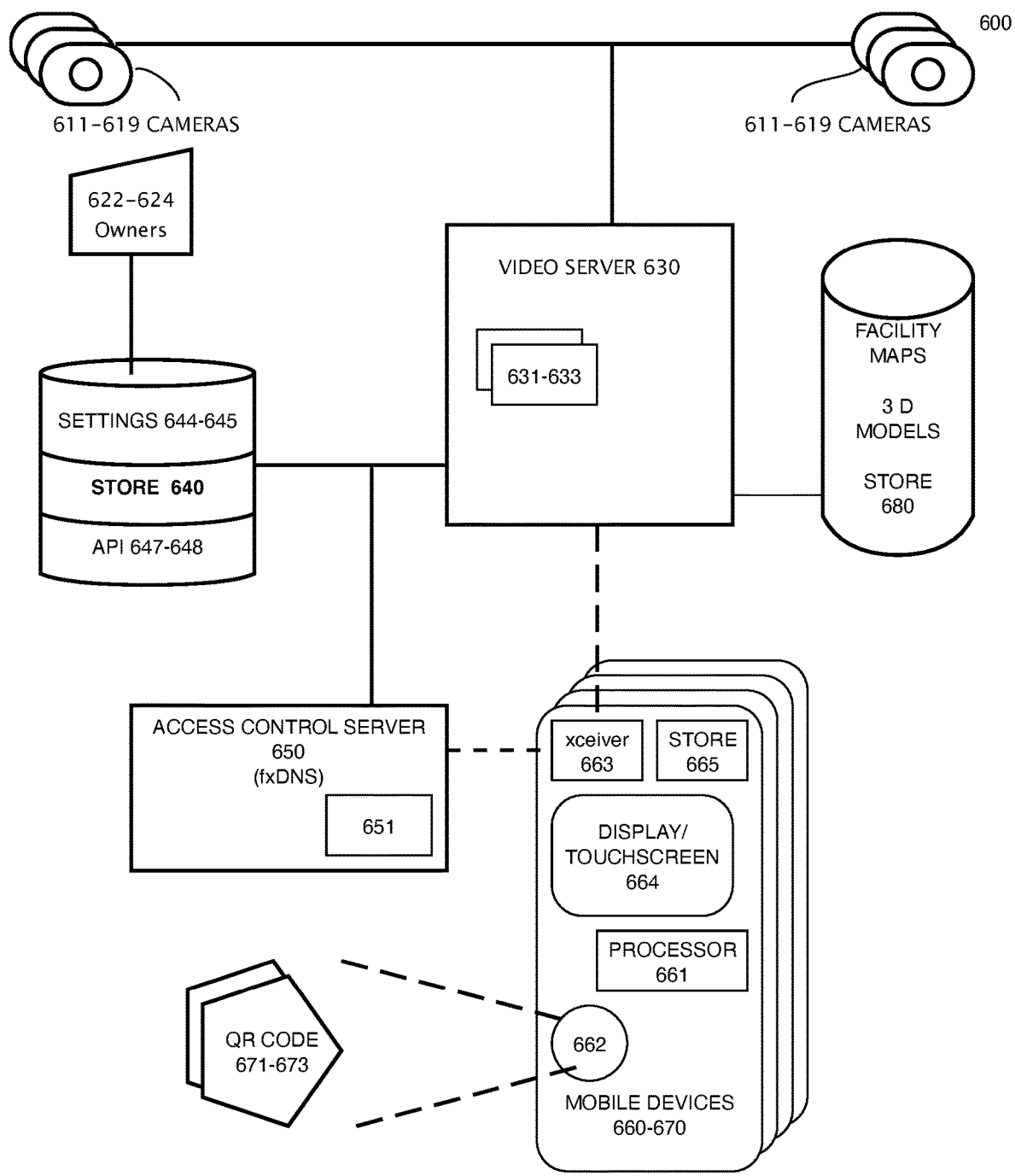
FIG. 6 is a block diagram illustrating an exemplary system that enables mobile devices to request and display video streams from cameras via an access control server and a video server according to settings.

Referring now to FIG. 6, an illustrative, non-limiting diagram is provided to enable appreciation of some of the inventive aspects herein claimed. A system 600 includes a plurality of cameras 611-619 belonging to a plurality of facility/video stream owners 622-624 which is coupled to a video server 630 which has a plurality of processors and processor cores 631-633. The video server is further coupled to a non-transitory store 640 encoded with settings 644-645, and executable instructions including a plurality of Application Programming Interfaces 647-648. An access control server 650 having at least one processor 651 is configured as a faux Domain Name System (fxDNS) server coupled to the video server 630, the store 640, and to a plurality of mobile emergency services agent's devices (mobile device) 660- 670. Each mobile device has a processor 661, a camera 662, a wireless data transceiver (xceiver) 663, a display/touch-screen 664, and non-transitory media store 665 in which is encoded identity indicia (e.g. MAC addresses) and executable instructions (apps). The executable instructions cause the mobile device processor to receive an optically encoded fictitious Domain Name System (ficDNS) name which may be captured by the camera 662 from a key chain or printed object or video screen 671-673 such as a QR code. The executable instructions of the mobile device further cause the processor to transform the ficDNS name into a UDP packet formatted as a DNS query (Query) and transmit it to the fxDNS server 650. A distinguishing characteristic of the invention is that the fictitious DNS name does not expose any logical or physical hierarchy of the video server or camera network. A distinguishing characteristic of the invention is that the fictitious DNS name can uniquely identify the user, the user's agency, the device of the user, and in some cases, the version of an application assigned to the user's agency. A distinguishing characteristic of the invention is that loss of control or duplication of the QR code does not expose the actual addresses of cameras or of video servers. Denial of service attacks on DNS servers are well understood and have known mitigation strategies. A distinguishing characteristic of the invention is that a customized client or application is not necessarily installed on the emergency service agent's device.

In an embodiment, the video server includes a plurality of processor cores 631-633 in which API virtual machine images 647-648 may be popped and purged by the access control server according to facility/video stream owner provided settings 644-645. Each emergency services agency may have its individually customized and dedicated API virtual machine image 647-648.

Upon receipt of the fxDNS server's response to the Query, the executable instructions of the mobile device further cause the processor to retrieve video images using the IPv6 address embedded within the Answer fields and to further exchange selections and video images with the API provided by the video server 630. In an embodiment, the access control server validates/authenticates the Query based on time, identity indicia, settings, and pops (causes to instantiate . . . ) a virtual machine image of a select API 647-648 into a processor core 631-633. A distinguishing characteristic of the invention is that an API is not instantiated into a processor unless a Query is validated. A distinguishing characteristic of the invention is that the API may limit access to certain cameras under certain conditions set by the facility/video stream owner. A distinguishing characteristic of the invention is that the IPv6 address is impermanent and does not expose any actual hardware address of a camera. The large address space of the IPv6 universe enables non-repeating assignment by the access control server thereby improving security.

In an embodiment, the video processor transforms a facility map or three-dimensional model from store 680 into an augmented reality view by combining with live video streams from the cameras 611-619.

A distinguishing characteristic of the invention is the settings that each facility/video stream owner has over what, when, and where private surveillance video images are displayed and to whom. A distinguishing characteristic of the system is that the emergency services agencies or their agents never have an account, user id, or password on the video server. A distinguishing characteristic of the invention is that MAC addresses may be added by the facility/video stream owner after the initial (training) familiarization access request for as long as the facility/video stream owner desires.

CONCLUSION

The object of the invention is to enable fire fighters and other emergency services agents to view in real time video streams from private security surveillance cameras without loss of control by the facility/video stream owners. Additionally, existing fire system drawings may be transformed by including viewports of live images and sensor readings.

A distinguishing characteristic of the invention is the settings that each facility/video stream owner has over what, when, and where private surveillance video images are displayed and to whom. A distinguishing characteristic of the system is that the emergency services agencies or their agents never have an account, user id, or password on the video server. A distinguishing characteristic of the invention is that MAC addresses may be added by the facility/video stream owner after the initial (training) familiarization access request for as long as the facility/video stream owner desires.

A distinguishing characteristic of the invention is that the fictitious DNS name does not expose any logical or physical hierarchy of the video server or camera network. A distinguishing characteristic of the invention is that the fictitious DNS name can uniquely identify the user, the user's agency, the device of the user, and in some cases, the version of an application assigned to the user's agency. A distinguishing characteristic of the invention is that loss of control or duplication of the QR code does not expose the actual addresses of cameras or of video servers. Denial of service attacks on DNS servers are well understood and have known mitigation strategies. A distinguishing characteristic of the invention is that a customized client or application is not necessarily installed on the emergency service agent's device.

Individual agencies may be selectively added, removed, or have access controlled by the release of time-limited versions of the app. The invention is distinguished by enabling different levels of access to individual emergency services agencies. Versions of apps may expire at different times or upon demand. Embedded agency identifiers in ficDNS names determine which API or which cameras are enabled and for their span of availability.

A distinguishing characteristic of the invention is that an emergency services agent does not have to enter a user or account id and password to request access to cameras in his scope of interest. A distinguishing characteristic of the invention is that requests for video streams of cameras is transmitted through an API of the video server and not by exposing hard coded camera identifiers or file hierarchies or network architecture. A distinguishing characteristic of the invention is that network firewalls are generally permeable to UDP packets and complex handshaking for verification is unnecessary.

The invention is distinguished by enabling a "deadman" operation which, in the absence of owner intervention after a trigger, interrupts or enables a default level of access control. E.g. instant ON followed after a period by continuation or denial. The invention is distinguished by enabling either static or dynamic video images according to the MAC address or the agency identifier when provided.

The invention is distinguished by supporting helmets or facemasks or goggles through which data and video streams may be displayed in context of where the agent is physically located. Video streams may enable looking through doors and walls or around corners using virtual mirrors. The invention is distinguished by combining video streams with the state of sensors, sprinklers, and non-visible measures (heat, CO) in a viewport.

The invention is distinguished by an access control server operating an fictitious domain names and returning synthetic addresses to an API.

A distinguishing characteristic of the invention is that a IPv6 link which is misappropriated has a limited shelf life and may never be repeated during the life of the universe.

The invention is easily distinguished by enabling use of commercial unmodified cellular telephones.

An Exemplary Suitable Operating Environment: Computing Device

In order to provide additional context for various aspects of the subject invention, FIG. 1 and the following discussion are intended to provide a brief, general description of a suitable operating environment 110 in which various aspects of the subject invention may be implemented. While the invention is described in the general context of computer-executable instructions, such as program modules, executed by one or more computers, processors, or other devices, those skilled in the art will recognize that the invention can also be implemented in combination with other circuits, program modules, and/or as a combination of hardware and software.

Generally, however, program modules include routines, programs, objects, components, data structures, etc. that perform particular tasks or implement particular data types. The operating environment 110 is only one example of a suitable operating environment and is not intended to suggest any limitation as to the scope of use or functionality of the invention. Other well known computer systems, environments, and/or configurations that may be suitable for use with the invention include but are not limited to, mobile phones, tablets, cloud servers, gaming devices, displays, identity credentials and their readers, cameras, attire, vehicles, medical devices, watches, robots, security instruments, weapons systems, entertainment devices, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 1, an exemplary environment 110 for implementing various aspects of the invention includes a computer 112. The computer 112 includes a processing unit 114, a system memory 116, and a system bus 118. The system bus 118 couples system components including, but not limited to, the system memory 116 to the processing unit 114. The processing unit 114 can be any of various available processors. Dual microprocessors and multi-core architectures also can be employed as the processing unit 114. Within this application the term "processor" also refers to implementations of 112 in highly integrated embodiments.

The system bus 118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 116 includes volatile memory 120 and nonvolatile memory 122. The basic input/output system (BIOS), containing the basic routines to transfer information between elements within the computer 112, such as during start-up, is stored in nonvolatile memory 122. By way of illustration, and not limitation, nonvolatile memory 122 can include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 112 also includes removable/nonremovable, volatile/nonvolatile computer storage media. FIG. 1 illustrates, for example a disk storage 124. Disk storage 124 includes, but is not limited to, devices like a magnetic disk drive, floppy disk drive, solid state drive, flash memory card, or memory stick. In addition, disk storage 124 can include storage media separately or in combination with other storage media including, but not limited to, network storage, array of disks, or quantum storage. To facilitate connection of the disk storage devices 124 to the system bus 118, a removable or non-removable interface is typically used such as interface 126.

It is to be appreciated that FIG. 1 describes software that acts as an intermediary between users and the basic computer resources described in suitable operating environment 110. Such software includes an operating system 128. Operating system 128, which can be stored on non-transitory media such as disk storage 124, acts to control and allocate resources of the computer system 112. System applications 130 take advantage of the management of resources by operating system 128 through program modules 132 and program data 134 stored either in system memory 116 or on disk storage 124. It is to be appreciated that the subject invention can be implemented with various operating systems or combinations of operating systems, virtual machines, and virtual machine images.

A user enters commands or information into the computer 112 through input device(s) 136. Input devices 136 include, but are not limited to, a radio, magnetic, or optical scanner, a pointing device such as, mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, HDMI, a serial port, a parallel port, a game port, and a universal serial bus (USB). Output device(s) 140 use some of the same type of ports as input device(s) 136. Thus, for example, a USB port may be used to provide input to computer 112, and to output information from computer 112 to an output device 140. Output adapter 142 is provided to illustrate that there are some output devices 140 like High Definition Televisions (HDTV), monitors, speakers, and printers among other output devices 140 that require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computer 112 can operate in a networked environment using logical connections to one or more remote computers, such as remote computer(s) 144. The remote computer(s) 144 can be a cloud service, personal computer, a server, a router, a network PC, a workstation, a microprocessor based appliance, a peer device or other common network node and the like, and typically includes many or all of the elements described relative to computer 112. For purposes of brevity, only a memory storage device 146 is illustrated with remote computer(s) 144. Remote computer(s) 144 is logically connected to computer 112 through a network interface 148 and then physically connected via communication connection 150. Network interface 148 encompasses communication networks such as cellular data, Wi-Fi, Bluetooth, Near Field Communications, local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, mesh, IP, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computer 112, it can also be external to computer 112. The hardware/software necessary for connection to the network interface 148 includes, for exemplary purposes only, internal and external technologies such as, modems including satellite, 802.11, CDMA, regular telephone grade modems, cable modems and DSL modems, ISDN adapters, and Ethernet cards.

SPIRIT AND SCOPE OF THE APPENDED CLAIMS

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. At a (faux DNS) fxDNS server, receiving a User Datagram Protocol (UDP) packet formatted as a Domain Name System (DNS) query,
    extracting the time and Media Access Control (MAC) source address for verification;
    extracting a (fictitious Domain Name) ficDNS name;
    verifying validity of query with facility/video stream owner settings (setting); and when verification equals TRUE;
    initiating a video server Application Programming Interface (API); and
    transmitting an Internet Protocol version 6 (IPv6) link to said video server to the source MAC address within a DNS answer packet.

2. The method of claim 1 at said fxDNS server, further comprising: determining verification by comparing said MAC source address with one of a white list and a black list.

3. The method of claim 1 at said fxDNS server, further comprising: determining verification by comparing UDP time with settings for TRUE.

4. The method of claim 1 at said fxDNS server, further comprising: determining verification by comparing facility/video stream identifier within the ficDNS name with valid setting for TRUE.

5. The method of claim 1 at said fxDNS server, further comprising: storing valid settings for time, MAC source address, facility/video stream identifier provided by facility/video stream owner.

6. The method of claim 1 further comprising: providing at least one obfuscated handle for a video stream by the video server linked through IPv6.

7. The method of claim 6 further comprising: providing a selectable logical map of cameras in the facility.

8. The method of claim 6 further comprising: providing a selectable physical map of cameras in the facility.

9. The method of claim 6 further comprising: providing a selectable three-dimensional physical model of camera locations in the facility.

10. The method of claim 9 further comprising: providing an augmented reality view of said selectable three-dimensional physical model of camera locations and orientation with viewports along camera boresights.

11. A method, at a device, comprising:
    decoding an optical image to determine a fictitious Domain Name (ficDNS name);
    transmitting a UDP packet formatted as a DNS query to a faux DNS (fxDNS) server said UDP packet comprising time, MAC source address, and said ficDNS name;
    receiving an IPv6 link in a UDP packet formatted as a response DNS query answer;
    causing an application to display video images by operating an API accessed via said IPv6 link; and
    receiving a selection among obfuscated camera handles to transmit through said API.

12. The method of claim 11 further comprising: concatenating an agency identifier provided by a facility/video stream owner to said ficDNS name.

* * * * *